United States Patent [19]

Kunz et al.

[11] Patent Number: 5,192,188

[45] Date of Patent: Mar. 9, 1993

[54] LOCK FOR THE LOADING AND/OR DISCHARGING OF BULK MATERIALS

[75] Inventors: Alfred Kunz, Witterswil; Walther Schwenk, Kaiseraugst; Jörg M. List, Pratteln, all of Switzerland

[73] Assignee: List AG, CH-Pratteln, Switzerland

[21] Appl. No.: 624,583

[22] Filed: Dec. 10, 1990

[30] Foreign Application Priority Data

Dec. 22, 1989 [CH] Switzerland ............ 04-588/89

[51] Int. Cl.$^5$ ............................................. C10J 3/30
[52] U.S. Cl. ..................................................... 414/217
[58] Field of Search .......................... 414/217, 219, 221

[56] References Cited

U.S. PATENT DOCUMENTS

| | | | |
|---|---|---|---|
| 1,974,789 | 9/1934 | Angell | 414/217 |
| 2,604,216 | 7/1952 | Martin | 414/217 |
| 2,906,417 | 9/1959 | Rossi | 414/217 |
| 4,400,125 | 8/1983 | Jensen | 414/221 |
| 4,687,408 | 8/1987 | Klambauer | 414/217 |

Primary Examiner—Jesus D. Sotelo
Assistant Examiner—Stephen P. Avila
Attorney, Agent, or Firm—Bachman & LaPointe

[57] ABSTRACT

A lock for the loading and/or discharging of, in particular, not easily flowing, adhering bulk materials into or out of a pressurized or vacuum chamber through a discharge opening of a discharge housing, the operating chamber being adjoined by a housing having an inlet connector. Guided in this housing is a piston which transports the bulk material from the inlet connector to the discharge housing. During this procedure, the discharge housing is closed off in relation to the housing by an openable valve.

10 Claims, 4 Drawing Sheets

LOCK FOR THE LOADING AND/OR DISCHARGING OF BULK MATERIALS

BACKGROUND OF THE INVENTION

The invention relates to a lock for the loading and/or discharging of, in particular, not easily flowing, adhering bulk materials into or out of a pressurized or vacuum chamber through a discharge opening of a discharge housing.

The discharge of bulk materials which are processed, e.g. mixed or kneaded, in pressurized or vacuum chambers takes place, for example, by means of so-called star feeder locks. In these star feeder locks, sectorial pockets are formed into which the bulk material drops as a result of its gravitational force. As soon as one pocket is filled, the star feeder is rotated further so that the next pocket can be filled while a pocket which has already been filled is emptied.

These vacuum star feeders entail problems, above all because, on the one hand, the pockets are not completely emptied. On the other hand, the pressure or the vacuum prevailing in the operating chamber must be sealed off by the star feeder, which is only effected unsatisfactorily. Thirdly, a volume of gas corresponding to the star feeder is also fed into the apparatus.

Furthermore, an arrangement is known, in which the operating chamber is adjoined by an intermediate container which is closed off, on the one hand, in relation to the chamber by means of a valve and, on the other hand, in relation to the actual discharge by means of a further valve. Here, too, the problem essentially lies in the fact that the product only passes through the valves and the intermediate container as a result of its own gravitational force. Furthermore, the valves must perform their sealing function against the vacuum or the pressure inside the product flow. It is true that special gates have been developed for this purpose, but these are complex and leave much to be desired regarding tightness. Moreover, prior to opening the corresponding gates, the intermediate container must be evacuated or aerated in order not to affect the pressurized or vacuum chamber. This requires idle times and makes the process more expensive.

Discharge of the abovementioned bulk materials is also possible by means of a screw conveyor, but the problems regarding sealing are even greater in this case.

Accordingly, it is the principle object of the present invention to develop a lock of the abovementioned type which has no effect on the pressure or the vacuum in the operating chamber, which discharges the product carefully, is of simple construction and operates with little wear.

SUMMARY OF THE INVENTION

The foregoing object is achieved by way of the present invention wherein a housing having an inlet connector adjoins the chamber and a piston is guided in the housing, which piston transports the bulk material from the inlet connector to a discharge housing, the discharge housing being closed off in relation to the housing by a openable valve.

In the present case, a piston lock is thus used, which has proved to be excellently suited especially for the discharge of not easily flowing, adhering bulk materials out of a pressurized or vacuum chamber. Especially if the product itself is highly toxic, i.e. if, in particular, the vapors prevailing in the operating chamber are not to pass to the outside, the present piston lock can be used. It operates without the chamber needing to be ventilated or evacuated in any manner.

The longitudinal axis of the housing preferably extends obliquely or perpendicular relative to the dropping direction of the bulk material when it runs into the housing and when it runs out of the discharge housing. It is guaranteed in this manner that the product passes in front of the end face of the piston due to its own gravitational force and there fills the chamber to the greatest extent. By this means, toxic vapors or the like are only also discharged to an extremely small extent.

The piston pushes the product from the inlet connector to the discharge housing so that a positive product conveying takes place, which does not depend solely on gravity.

During the transport of the bulk material, no shearing takes place so that the bulk material can be said to be carefully treated. At the discharge housing itself, the bulk material is pushed completely out of the housing by the piston so that no residues whatsoever remain on the sealing surfaces. For this reason, reliable closing of the valve also takes place again since the valve does not have to close against a product flow and no product is trapped between the sealing surfaces of the valve.

In the present case, major attention is to be given to the sealing of the piston. The slight ventilation or deaeration of the operating chamber during the ejection operation also depends on the sealing. In an exemplary embodiment of the invention, the sealing arrangement consists of a slide ring having an adjacent sealing lip and subsequent scrapers. This arrangement is still relatively complicated and subject to relatively high wear. For this reason, the inventor has developed a far better seal which consists of a slide ring in a bearing housing which is followed by at least one sealing ring, in particular a Teflon ring. This sealing ring has an incision, into which a pressure ring is inserted. A Viton ring, in particular, has proved to be effective as the pressure ring. This pressure ring has the task of feeding the sealing edge towards the piston in the case of any wear of the Teflon ring.

Moreover, the sealing ring is provided with a sloping sealing edge which adapts to the piston and seals it off over a flat surface area.

In practice, it has been established that leakages are avoided to the greatest possible extent using this seal according to the invention. Nevertheless, the seal does not lie so close to the piston that additional heat is generated, which is generally undesirable.

The inventor has also provided a concept for the valve between the discharge housing and the piston housing. In this case, the usually cylindrical opening of the piston housing is closed off using a closure plate which engages in the opening of the piston housing in the closed position and occupies its valve seat with a sloping circumferential edge. The closure plate is thus located opposite the end face of the piston, both being arranged in parallel planes The sealing off is preferably metallic.

Furthermore, the closure plate is held in the closed position via a spring mechanism which can compensate any inaccuracies in fit, if necessary. The closure plate is moved via a corresponding hydraulic or pneumatic cylinder unit with an extending piston rod.

The device is preferably used for vacuum. In the first end position, the end face of the piston is retracted so far that bulk material can pass via the inlet connector into the chamber in front of the end face of the piston. This bulk material is pushed approximately horizontally by the piston to the discharge housing, the clear width of the inlet connector first being passed over and then a subsequent sealing arrangement of the type described above.

After this sealing arrangement has been passed over, the closure plate is lifted from the opening of the housing, so that bulk material can be ejected from the housing and can drop through the corresponding discharge opening.

The piston is moved forwards until the plane of its end face lies approximately in the plane of the opening of the housing. It is guaranteed by this means that no bulk material whatsoever remains in the housing itself, which could impede the tight closing of the valve in the subsequent step.

Now, the piston is retracted a short distance so that sufficient space is exposed to allow tight closing by the closure plate. If the closure plate occupies its seat at this moment, there is only a very small space filled with extraneous air between the end face of the piston and the closure plate, the volume of which space has absolutely no effect upon the operating chamber. If the piston is now retracted, a vacuum already arises in the space between the closure plate and the piston, which guarantees that virtually no extraneous gas passes into the operating chamber after the corresponding seal and the inlet connector have been passed over. Bulk material now drops again out of the operating chamber through the inlet connector into the chamber in front of the end face of the piston.

It is thus guaranteed by this arrangement that, on the one hand, as little extraneous gas as possible, e.g. nitrogen or oxygen, which are both undesirable, pass into the operating chamber; on the other hand, likewise hardly any gases escape with the bulk material from the operating chamber to the outside, which gases can, for example, be toxic or inflammable.

No ventilation or evacuation of an intermediate receptacle is necessary in this case such as, for example, in the case of discharging by means of two valves with an intermediate container or even in vacuum star feeder locks.

Despite the special design of the seals according to the invention, it has been proved in practice that, in many cases, with abrasive products the sealing edges become worn, in particular sheared off, too rapidly with the movement of the piston. In a particular embodiment of the invention, the piston for ejecting the bulk material is therefore enclosed by a tube which is in close contact with the inside of the housing. This applies in particular to the contact with the seals. This tube is open at the front towards the bulk material, the end face of the piston hereby being visible.

As soon as bulk material has passed into the chamber in front of the end face of the piston, this tube is moved in a first operating step by means of a corresponding piston/cylinder unit in such a way that it closes off the inlet connector and at the same time takes up and encloses the bulk material inside itself. There is no seal after the inlet connector. In contrast, the tube contacts with its opening edge a sealing ring which also interacts simultaneously with the closing edge of the closure plate of the valve.

The piston is now set in motion via a corresponding drive in a similar manner to that described in relation to FIG. 1, in which case it slides in the tube and has corresponding annular seals in relation to the tube. These annular seals can be of similar construction to those described in relation to FIGS. 2 and 3.

During its movement, the piston carries the bulk material along, the valve exposing an opening and the bulk material being able to drop through the discharge opening.

After discharge of the bulk material, the closure plate of the valve closes the opening in front of the end face of the piston, and the piston and the tube are retracted into their starting position. Now bulk material can again pass out of the operating chamber, through the inlet connector, in front of the end face of the piston.

This arrangement according to the invention provides careful treatment of, above all, the seals inside the housing of the piston lock.

BRIEF DESCRIPTION OF THE DRAWINGS

Further advantages, features and details of the invention emerge from the subsequent description of preferred exemplary embodiments and with reference to the drawing, in which.

DETAILED DESCRIPTION

Figure 1:
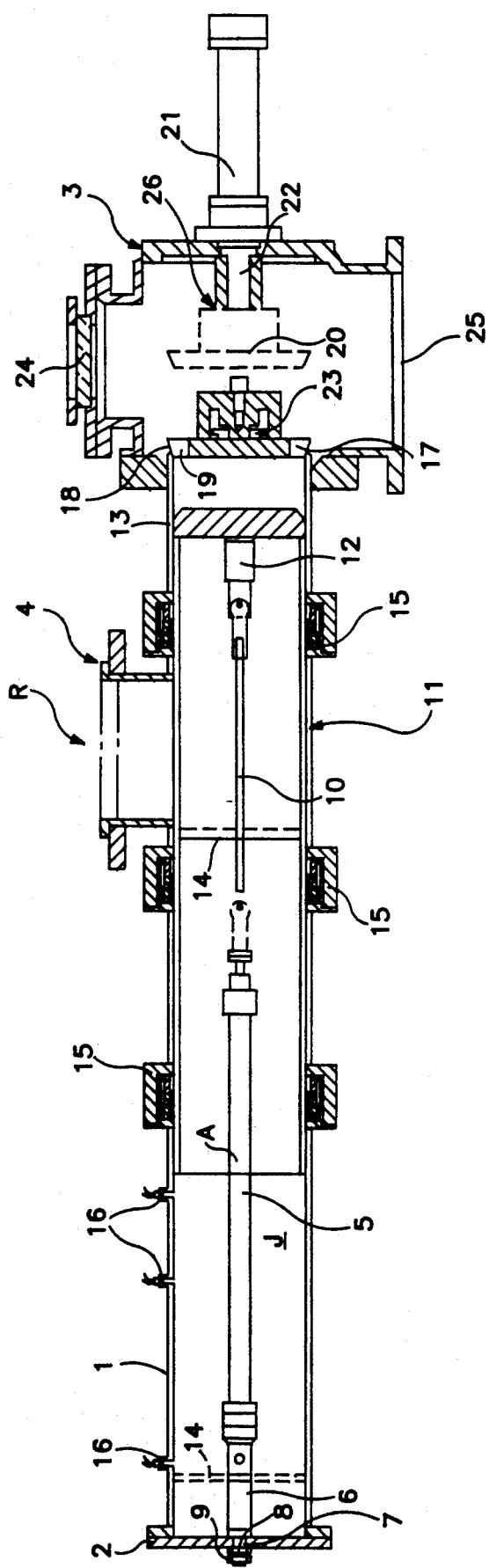
FIG. 1 shows a longitudinal section through a piston lock according to the invention.

According to FIG. 1, a piston lock R according to the invention has a housing 1 which is preferably of cylindrical shape. At one end, this housing 1 is closed off by an end plate 2 whereas, at the other end, the housing 1 is adjoined by a discharge housing 3. Furthermore, the housing 1 has an inlet connector 4, via which the housing 1 is connected to a corresponding mixing or kneading device or the like. Not easily flowing, adhering bulk materials are preferably processed, in particular kneaded, under pressure or vacuum in this mixing or kneading device.

A cylinder 5 passes axially along part of the inside I of the housing 1, which cylinder is connected in an articulated manner at one end to a connection piece 6 which penetrates the end plate 2 with a threaded pin 7, a nut 8 and a check nut 9 being screwed onto the threaded pin 7 a the other end.

At the other end, a piston rod 10 leads out of the cylinder 5 and at least partially penetrates a piston 11. This piston rod 10 has at the end a likewise articulated connection to a further connection piece 12 which lies fixedly from the inside on an end face 13 of the piston 11.

FIG. 1 illustrates the piston 11 in a position in which it conveys corresponding bulk material, by pushing it in front of itself, to the discharge housing 3. In its retracted end position 14, illustrated only in dashed lines, the end face 13 extends approximately in the plane of the wall of the inlet connector 4 in such a way that the inlet connector 4 is exposed towards the inside I of the housing 1. In this end position 14 illustrated in dashed lines, bulk material can pass out of the kneading machine (not shown in detail) or a similar device through the inlet connector 4 in front of the end face 13 of the piston 11.

The piston 11 is guided in the housing 1 through three sealing arrangements 15, which are described in greater detail below. 16 indicates initiators, via which the positions of the piston can be determined. The discharge housing 3 is pushed onto the housing 1 in a sealing manner, the opening of the housing 1 inside the discharge housing 3 being closed off by a disk-shaped closure plate.

This closure plate 17 has a sloping closing edge 18 which fits into the cylindrical opening 19 of the housing 1. The closure plate 17 is moved along the longitudinal axis A of the housing 1, i.e. in the direction of movement of the piston 11. An opened position of the closure plate 17 is indicated in dashed lines at 20. The movement of the closure plate 17 is effected, in turn, via a pneumatically or hydraulically driven cylinder 21 which engages the closure plate 17 with a piston rod 22. Provided additionally between the piston rod 22 and the closure plate 17 is a spring mechanism 23, it being possible for this spring mechanism, for example, to be effected by corresponding cup springs. By this means, inaccuracies of movement of the closure plate 17 can be compensated upon occupation of its fitting seat in the opening 19.

It is possible to look into the discharge housing 3 from above through an inspection glass 24. Located opposite the inspection glass is the discharge opening 25, through which the bulk material passes for further processing.

The piston lock according to the invention functions as follows:

At the beginning of the action, the piston 11 is situated in the end position defined by 14, indicated in dashed lines. The inlet connector 4 is open towards the inside I of the housing so that bulk material to be discharged can pass through the inlet connector 4 in front of the end face 13 of the piston 11.

Now the piston 11 is moved by the pneumatic or hydraulic cylinder 5 via the piston rod 10 along the longitudinal axis A of the housing 1 towards the discharge housing 3, the end face 13 of the piston 11 pushing the bulk material in front of it. Thus a positive product conveying (not only due to gravitational force) takes place. Simultaneously, the bulk material is treated carefully since it is not subject to shearing or the like.

As soon as the piston 11 has travelled a given distance, the valve 26 in the discharge housing 3 opens, said valve consisting essentially of closure plate 17, spring mechanism 23, piston rod 22 and cylinder 21, the closure plate 17 being moved into its opened position 20. The bulk material can now pass via the edge of the opening 19 into the discharge housing 3 and through the discharge opening 25.

The point in time at which the valve 26 opens is otherwise determined at least in such a way that the end face 13 has already passed over the clear width of the inlet connector 4 and also the subsequent sealing arrangement 15. Thus at this point in time at which the valve 26 opens, the inlet connector 4 is completely sealed off so that there is no reduction in the pressure or vacuum with which the upstream device operates.

After the end face of the piston 11 has reached the front edge of the opening 19, it is guaranteed that all the product has been discharged out of the housing 1. Now the piston 11 is retracted slightly so that the valve 26 can close.

This operation is controlled in such a way that there is only a slight gap between the end face 13 and the closure plate 17. Thus only an absolute minimum volume of extraneous air is carried along by the piston to the inlet connector 4. This extraneous air has a minimum effect on the vacuum or the pressure present in the upstream device.

Figure 2:
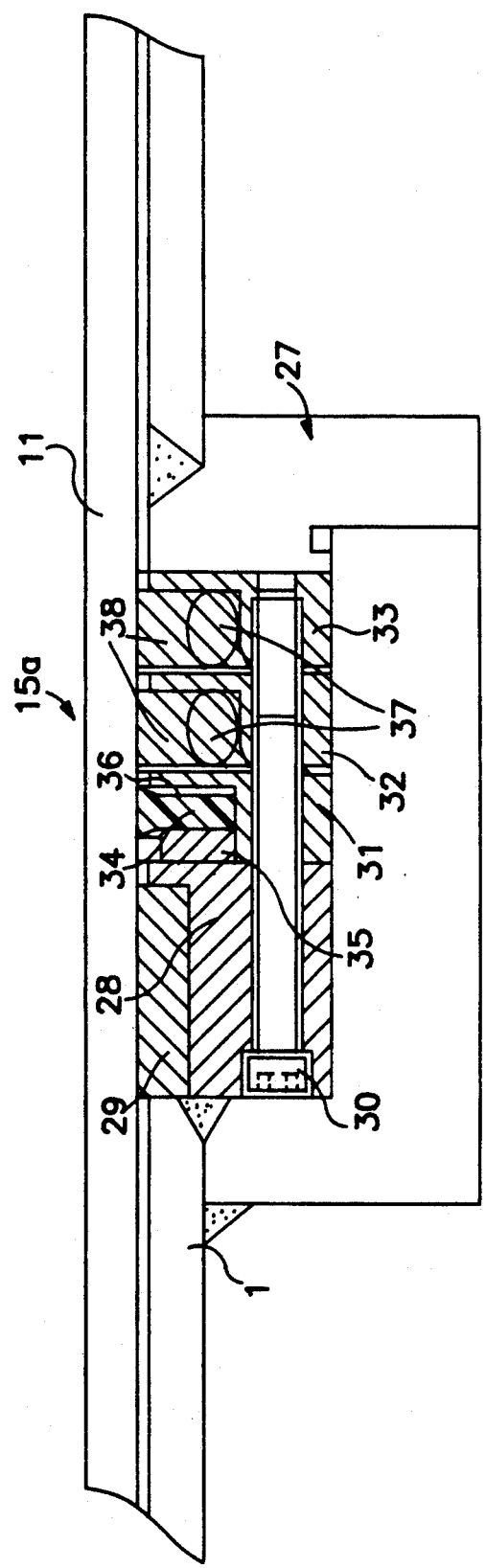
FIG. 2 shows a longitudinal section through the piston lock according to FIG. 1 in the region of a seal according to the invention, in an enlarged illustration.

Particular attention is to be paid to the sealing arrangements 15, by means of which it is to be guaranteed that as little as possible ventilation or deaeration take place via the housing 1. An exemplary embodiment of this sealing arrangement 15a is illustrated in FIG. 2. In the region of the sealing arrangement 15a, the housing 1 is interrupted. The interruption is bridged by a two-part sealing shell 27 which is welded to the housing 1. The actual bearing housing 28 is inserted into this sealing shell 27. This bearing housing 28 holds a bearing ring 29 towards the piston 11, which bearing ring effects a first sealing off.

Further sealing housings 31, 32 and 33 are connected to the bearing housing 28 via a screw bolt 30. Inserted in the sealing housing 31 is a sealing lip 34 which is supported on one side against a distance ring 35 and on the other side against a Viton disk 36. The two sealing housings 32 and 33 comprise an identical configuration. In both cases, an O-ring 37 presses a scraper 38 against the piston 11.

Figure 3:
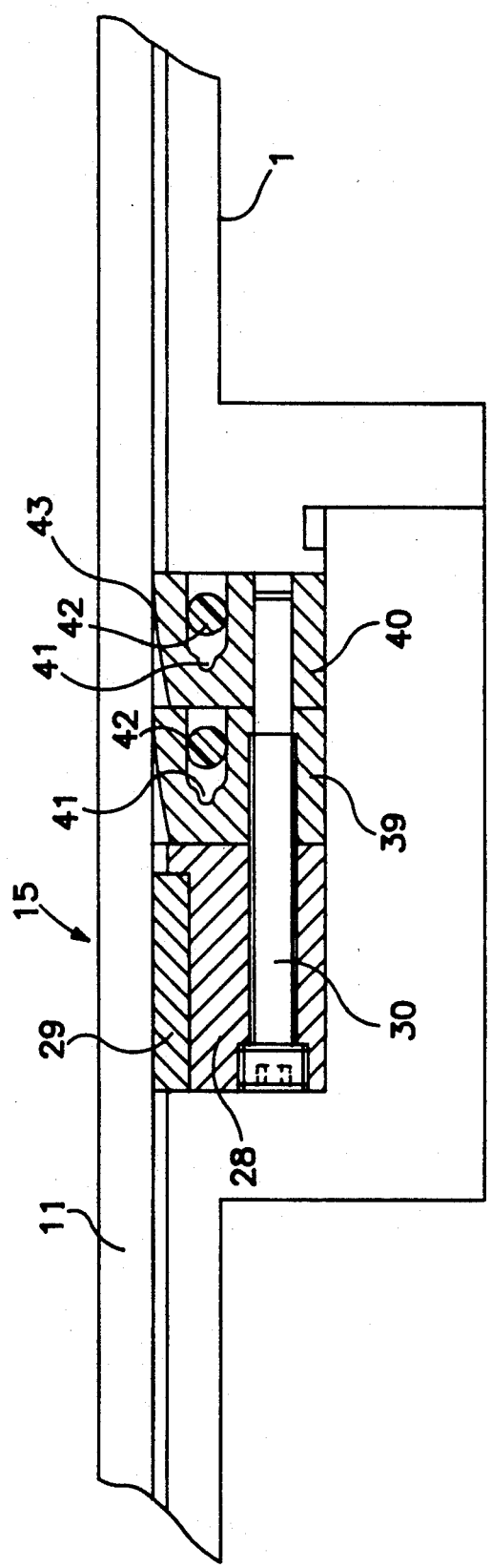
FIG. 3 shows a longitudinal section through a further exemplary embodiment of a seal corresponding to FIG. 2.

In a further exemplary embodiment of the sealing arrangement 15 according to FIG. 3, the sealing housings are replaced by Teflon rings 39 and 40 which have an incision 41. Placed in each incision 41 is an elastomeric ring 42. This arrangement has been established in practice to be very low on wear with the highest possible sealing effect. The elastomeric ring 42 exerts a certain spreading effect inside the Teflon ring so that a preferably slightly sloping sealing edge 43 of the Teflon ring 39 or 40 is always held in close contact with the piston 11.

A further exemplary embodiment of the invention is described in FIG. 4 in different operating positions. Differing from the exemplary embodiment according to FIG. 1, the piston 11a is enclosed by a tube 44, this tube 44 being supported via corresponding sealing arrangements 15a towards the housing 1a of the piston lock R1.

The tube 44 is of displaceable design, it being moved by means of a piston-cylinder drive 45. During its movement to the right in the present exemplary embodiment and shown in FIG. 4b), it closes off the inlet connector 4 and thereby encases or encloses the bulk material. In the end position, the tube 44 contacts with its opening edge 46 a sealing ring 47 and bears against this sealing ring 47 in a sealing manner. This sealing ring 47 can also simultaneously constitute the seat for the closure plate 17.

Figure 4A:
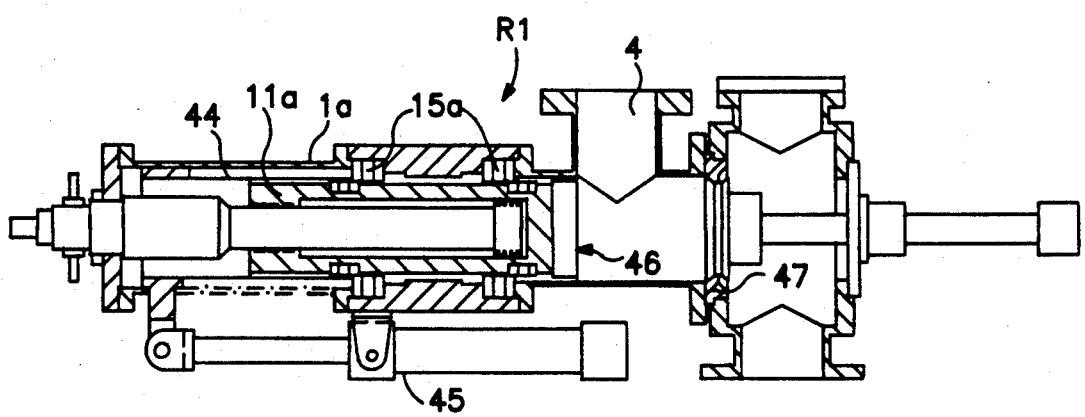
FIG. 4 shows a longitudinal section through an improved embodiment of a piston lock at various operating stages a-d.
Figure 4B:
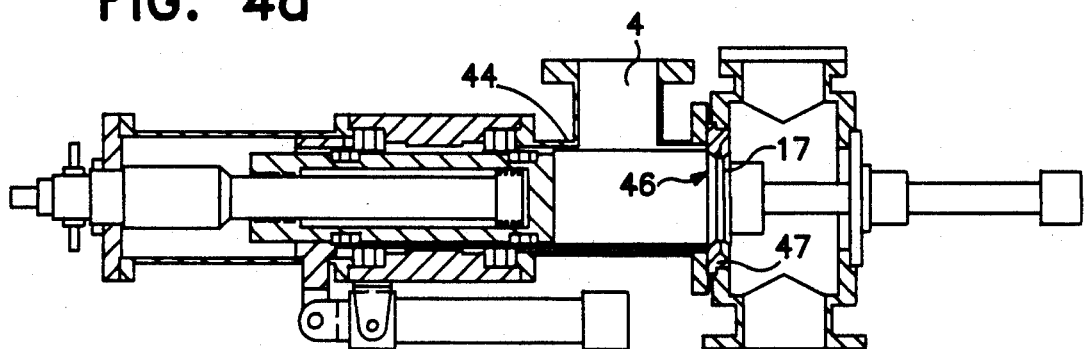
Figure 4C:
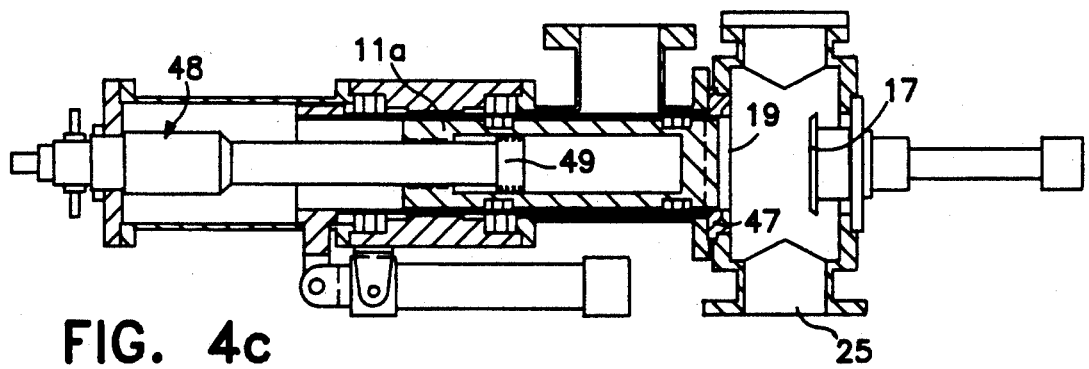

As soon as the tube 44 has reached its end position, the piston 11a can be thrust forwards in the tube 44, as shown in FIG. 4c), in which case it carries along the bulk material and ejects the latter through the opening 19 whilst the closure plate 17 is lifted so that the bulk material can drop through the discharge opening 25. The movement of the piston 11a inside the tube 44 is effected by a hydraulic or pneumatic drive 48, appropriate pressure medium flowing into a propulsion chamber 49 during propulsion of the piston 11a.

Figure 4D:
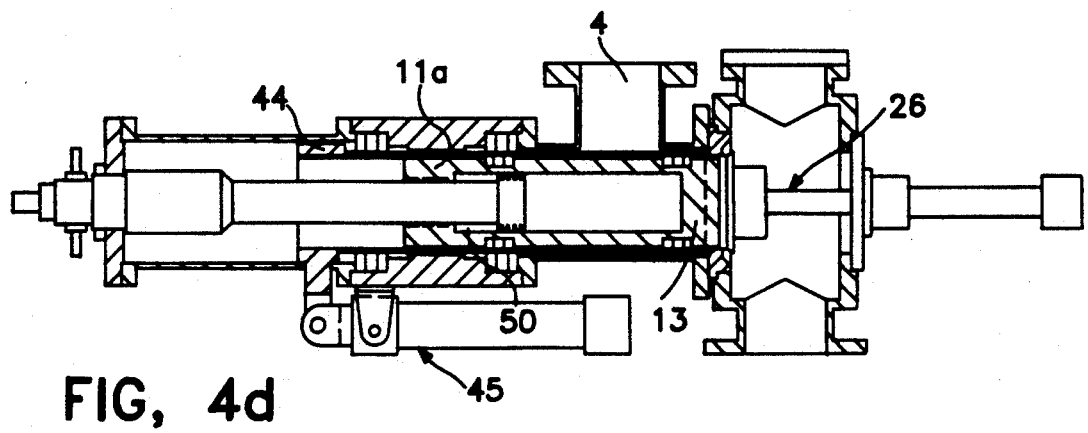

After the bulk material has been ejected, the valve 26 closes again, as is shown in FIG. 4d). Now a return chamber 50 in the piston 11a is flooded so that the piston 11a returns to its starting position. The tube 44 is also simultaneously retracted into its starting position by means of the drive 45. Bulk material can now again pass out of the operating chamber through the inlet connector 4 in front of the end face 13 of the piston 11a.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A lock for the loading and/or discharging of, in particular, not easily flowing, adhering bulk materials into or out of a pressurized or vacuum chamber through a discharge opening of a discharge housing, comprises a housing having an inlet connector adjoining an operating chamber and a piston guided in the housing, a movable piston for transporting the bulk material from the inlet connector to a discharge housing, wherein the discharge housing is closed off in relation to the housing by a valve wherein the piston is guided by a sealing arrangement and is movable from one end position on one side of the inlet connector wherein the piston is sealed and exposes the inlet connector for receiving bulk material into the housing to the other end position on the other side of the inlet connector wherein the piston is sealed and the valve is opened for discharging bulk material into the discharge housing and thereafter to an intermediate position between the end positions wherein the valve closes.

2. The lock as claimed in claim 1 wherein the housing has a longitudinal axis (A) arranged perpendicular relative to the dropping direction of the bulk material when it runs into the housing and when it runs out of the discharge housing.

3. The lock as claimed in claim 1 wherein the sealing arrangement consists of a slide ring having an adjacent sealing lip and subsequent scrapers.

4. The lock as claimed in claim 1 wherein the sealing arrangement comprises at least one sealing ring which follows a slide ring provided in a bearing housing.

5. The lock as claimed in claim 1 wherein the valve has a closure plate which closes off an opening in the housing.

6. The lock as claimed in claim 5 wherein the closure plate is connected via a suspension and a piston rod to a drive means.

7. The lock as claimed in claim 1 wherein the piston is driven by drive means.

8. A lock for the loading and/or discharging of, in particular, not easily flowing, adhering bulk materials into or out of a pressurized or vacuum chamber through a discharge opening of a discharge housing, comprises a housing having an inlet connector adjoining an operating chamber and a piston guided in the housing, a movable piston for transporting the bulk material from a the inlet connector to the discharge housing, wherein the discharge housing is closed off in relation to the housing by a valve and the valve has a closure plate which closes off an opening in the housing wherein the closure plate is connected via a suspension and a piston rod to a drive means.

9. The lock as claimed in claim 8 wherein the closure plate is located opposite an end face of the piston.

10. The lock as claimed in claim 8 wherein the longitudinal axis (A) of the housing is arranged perpendicular relative to the dropping direction of the bulk material when it runs into the housing and when it runs out of the discharge housing.

* * * * *